Guy W. Whitehead
INVENTOR.

July 6, 1954

G. W. WHITEHEAD 2,682,900

CITRUS FRUIT REAMER

Filed Dec. 19, 1949

Guy W. Whitehead
INVENTOR.

BY Clarence A. O'Brien
and Harvey B. Jacobson
Attorneys

July 6, 1954
G. W. WHITEHEAD
2,682,900
CITRUS FRUIT REAMER
Filed Dec. 19, 1949
4 Sheets-Sheet 3
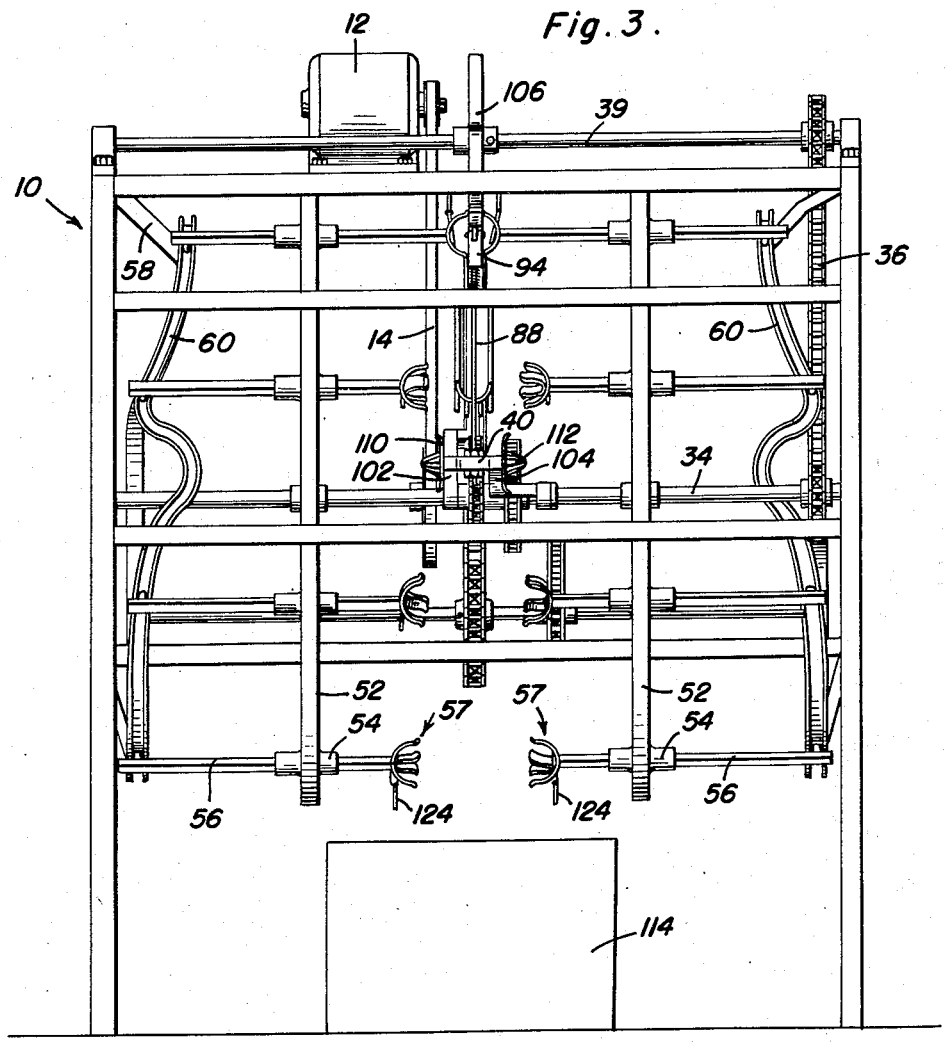
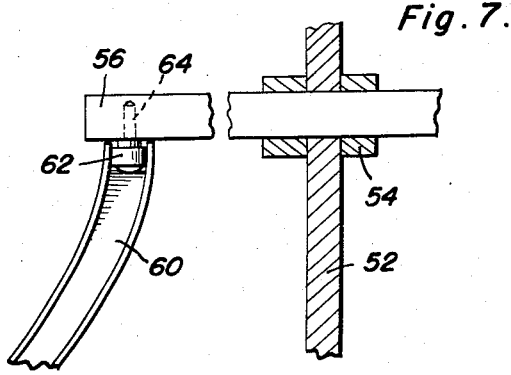
Guy W. Whitehead
INVENTOR.

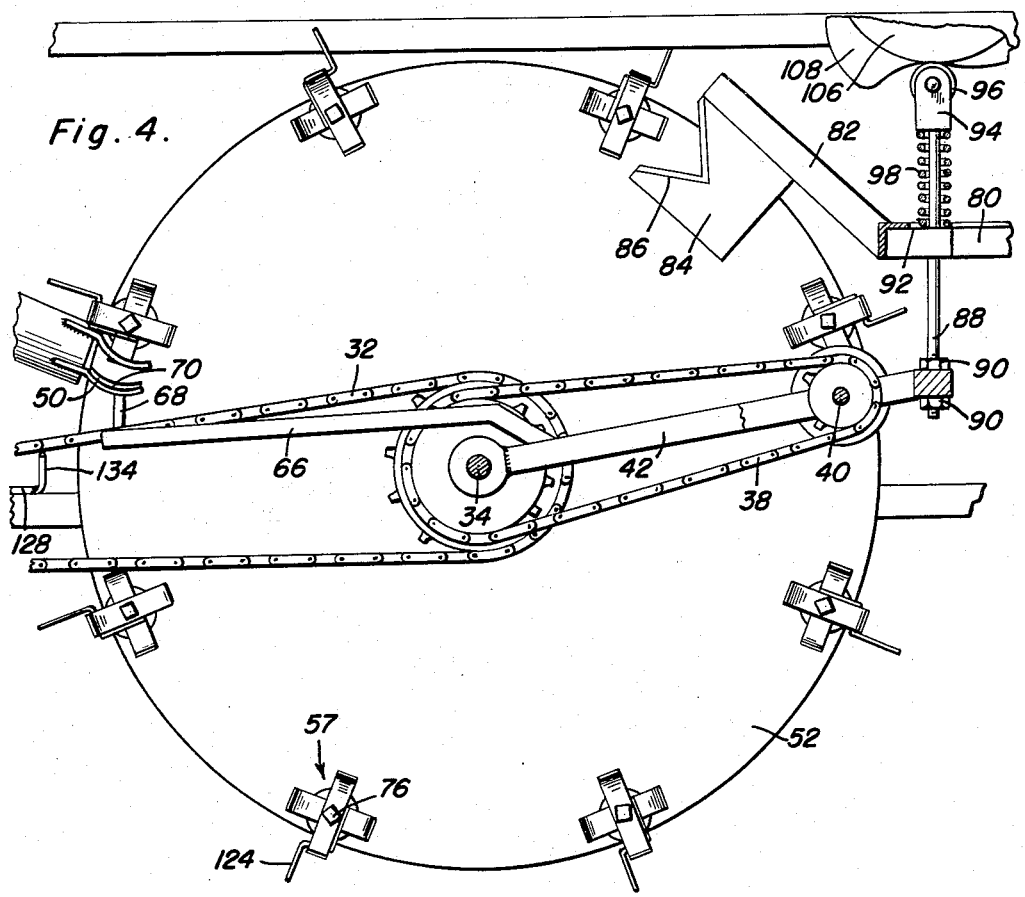
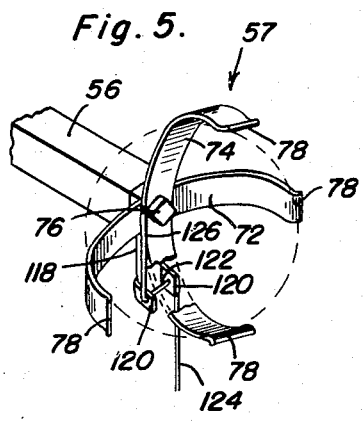
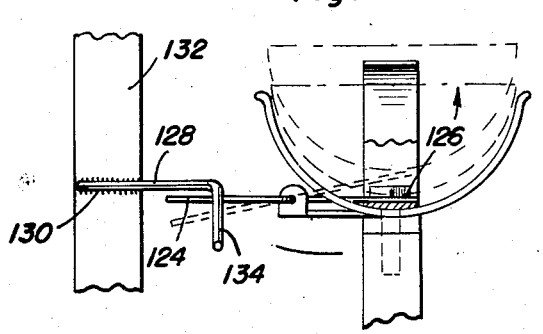

Patented July 6, 1954

2,682,900

UNITED STATES PATENT OFFICE 2,682,900

CITRUS FRUIT REAMER

Guy W. Whitehead, Sacramento, Calif.

Application December 19, 1949, Serial No. 133,755

2 Claims. (Cl. 146—3)

This invention comprises novel and useful improvements in a citrus fruit extractor and more specifically pertains to an apparatus for automatically feeding citrus fruits into the machine, halving the same, reaming out the fruit halves for extracting the juice therefrom, and subsequently discarding the juiced rinds of the fruit.

The primary object of this invention is to provide an apparatus capable of automatically handling citrus fruits in an improved manner for halving and juicing the same.

A further important object of the invention is to provide an apparatus capable of automatically juicing citrus fruits and the like together with arrangements whereby the juiced and halved citrus fruits may be ejected from the machine.

These, together with various ancillary objects and features of the invention which will later become apparent as the following description proceeds, are attained by the present invention, a preferred embodiment of which has been illustrated by way of example only in the accompanying drawings, wherein:

Figure 3 is an end elevational view taken from the right end of Figures 1 and 2 at the juicing stations of the machine;

Figure 4 is an enlarged vertical longitudinal sectional detail view taken substantially upon the plane indicated by the section line 4—4 of Figure 1;

Figure 5 is an enlarged fragmentary perspective view of one of the resilient fruit holders forming an element of this invention;

Figure 6 is an enlarged fragmentary sectional detail view illustrating more clearly the operation of the ejector for the fruit holders of this invention; and, Figure 7 is an enlarged fragmentary sectional detail view, parts being broken away, showing the manner in which the fruit holders are reciprocated by an actuating cam.

Referring now more specifically to the accompanying drawings, wherein like numerals designate similar parts throughout the various views, there has been illustrated in the various figures and drawings one satisfactory embodiment of apparatus in accordance with the principles of this invention for automatically handling citrus fruits such as oranges or the like, feeding the fruit into the apparatus, conveying the fruit in resilient fruit holders past a stationary knife for severing or halving the fruit; the improved means for forcing the halved fruit upon reamers for extracting the juice therefrom; together with means for extracting or ejecting the rind of the juiced and halved fruit from the holding means. It is a very essential principle of this invention to provide an automatic apparatus which shall be of a compact and portable nature, and wherein the fruit is automatically manipulated entirely by the apparatus during the treatment of the fruit wherein the various operations are performed in synchronized and timed relation with respect to each other.

Figure 1:
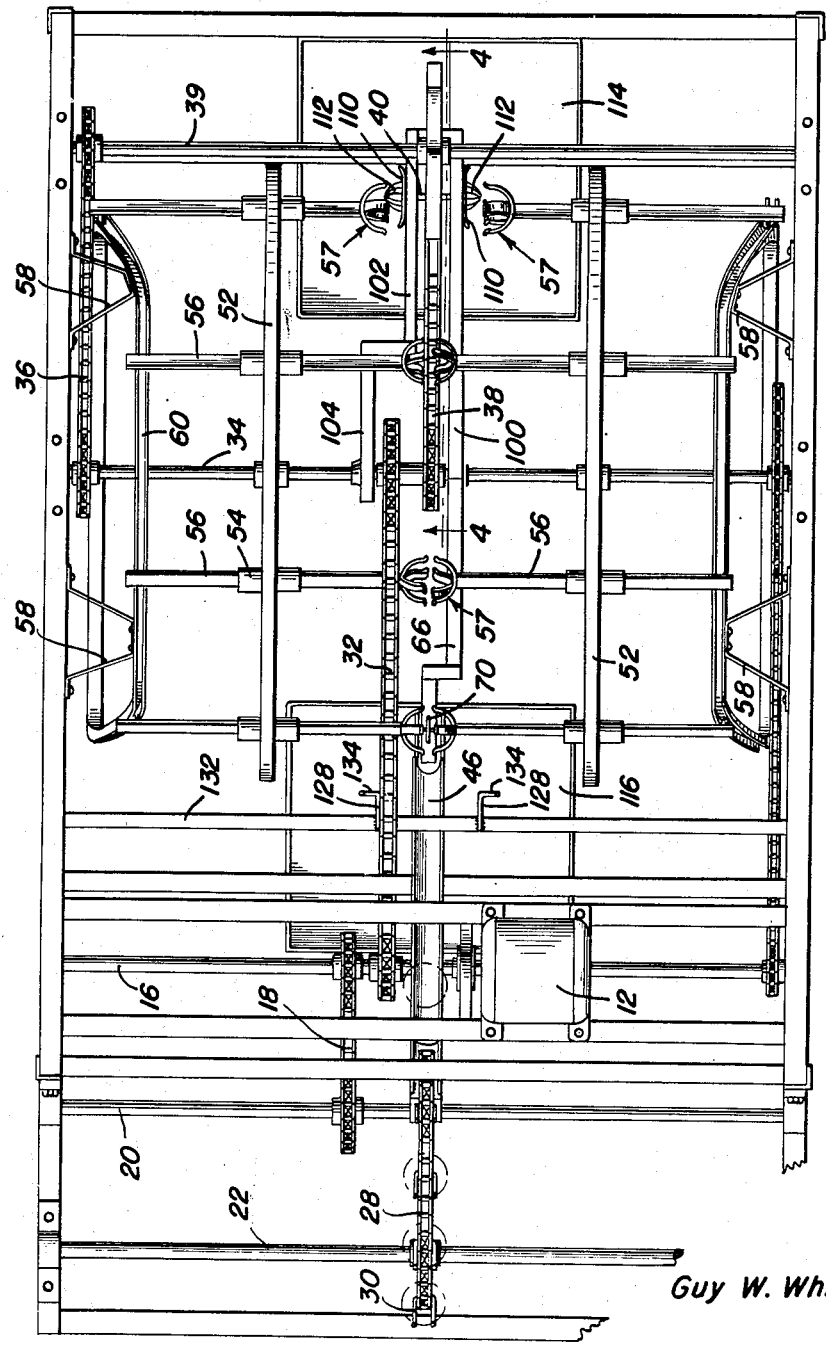
Figure 1 is a fragmentary top plan view of an apparatus for carrying out the principles of this invention.
Figure 2:
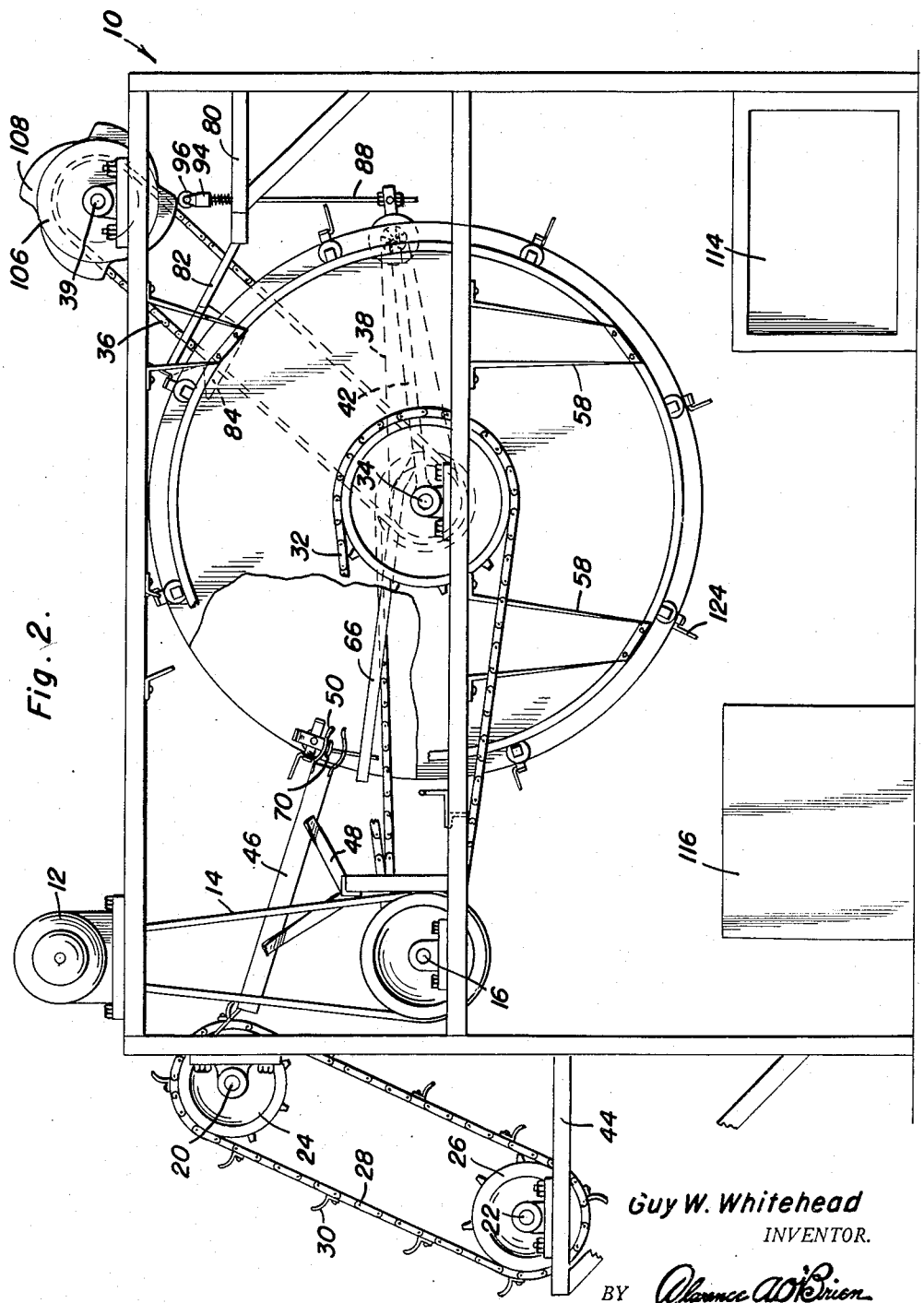
Figure 2 is a fragmentary side elevational view of the apparatus shown in Figure 1, parts being broken away.

In the accompanying drawings, attention is directed first to Figures 1-3 wherein it will be seen that the apparatus disclosed as an exemplification of the principles of this invention consists of a supporting framework indicated generally by the numeral 10 and which may be of any suitable character. Mounted upon the supporting framework in any convenient manner, is a source of power such as an electric motor 12 and which is operatively connected in any desired manner as by a belt and pulley drive indicated at 14, to the driven shaft 16 which is rotatably journalled upon the framework 10. By means of a sprocket chain drive 18, the shaft 16 is operatively connected with the driving shaft 20 of an endless conveyor, the same including a driven shaft 22, the shafts 20 and 22 being conveniently journalled upon one end of the supporting framework 10. The shafts 20 and 22 are provided with a pair of sprocket wheels 24 and 26 respectively over which wheels is entrained an endless chain 28 having a plurality of cups 30 attached thereto and constituting a conventional form of endless chain elevating conveyor.

By means of a sprocket chain drive 32, the shaft 16 is in turn drivingly connected to a shaft 34 and the shaft 34 is likewise suitably journalled upon the supporting framework 10.

A further sprocket chain drive 36 operatively connects the shaft 34 with a cam shaft 39, the latter likewise being journalled upon the upper portion of the supporting framework 10. The operating mechanism of the invention is completed by a final chain drive 38 which operatively connects the shaft 34 with a shaft 40, which as shown more clearly in Figure 4 is journalled in a pivoting arm 42 having one end upon the shaft 34.

The above described driving mechanism actuates the various instrumentalities of the improved citrus fruit extractor forming the subject of this invention from the electric motor 12 constituting the common source of power, these instrumentalities being more specifically described hereinafter.

The various elements or instrumentalities which in their entirety comprise the apparatus forming the subject of this invention, consist of a supply mechanism for transporting citrus fruit or the like individually from a hopper or from a storage hopper or cleansing tank and through a delivery chute to a delivery station; a transfer mechanism for successively and individually raising a single fruit from the delivery station in timed relation to the operation of the rest of the mechanism; a rotary carrier for receiving the individual fruit elevated by the transfer mechanism and for transporting the same in a circular path to the various elements of the machine as set forth hereinafter; holders carried by the rotary carrier for receiving and retaining the fruit during its transit past the various operational stations of the machine together with specific mechanism for actuating the holders in timed relation to the other operational phases of the apparatus; a slicer for severing the fruit during its transportation by the rotary carrier; a juicer for reaming out the severed halves of the fruit to extract the juice therefrom; and an ejector for discarding the juiced halves or rinds of the fruit from the holders at a discharge station in the machine.

While it will be readily appreciated that various of these elements or instrumentalities of the apparatus may be replaced by equivalent structures, and while it will be understood that various useful sub-combinations of these elements can be employed to attain desired results, as set forth and as claimed more specifically hereinafter, it is deemed to be preferable to illustrate and describe the construction and operation of the machine which includes all of the various enumerated elements.

Fruit supply mechanism

The mechanism for supplying the fruit to the machine, so that the entire manipulation of the fruit may be by automatic mechanism, without necessity for handling of the fruit by hand includes the above mentioned endless elevating conveyor including the two shafts 20 and 22, together with the conveyor chain 28 and the conveyor cups 30 thereon. As will be apparent from Figure 2, it is preferred to form or position this elevating conveyor at one end of the apparatus, and preferably the driven or lowermost shaft 22 of the conveyor is journalled upon a laterally extending supporting platform or framework 44, so that the chain 28 and the cups 30 thereon may extend below this platform during rotation of the conveyor. Preferably, a fruit supplying hopper or a tank for cleansing fruit may be disposed in proper relation to the supporting platform 44 and the conveyor chain 28 so that upon rotation of the conveyor the hooks or cups 30 will each pick up and elevate a single citrus or other fruit during rotation of the conveyor. The fruit so selected and elevated is then discharged over the top of the conveyor and of the driving shaft 20, into an inclined delivery chute or trough 46, of any desired construction, and which may be mounted upon suitable brackets or supports 48 on the framework 10. At its lower end, the delivery chute 46 is provided with a plurality of resilient fingers 50 which are so shaped to yieldingly receive and support the endmost row of fruits received in the delivery chute 46, whereby this endmost fruit may be removed by the rotary carrier as set forth hereinafter.

Rotary carrier

The rotary carrier which receives in sequence the fruit disposed at the delivery station by the delivery chute, preferably includes a pair of wheels, disks or other bodies 52, which may be of identical construction, and which are preferably fixedly secured in properly spaced relation with respect to each other to the shaft 34 for rotation therewith. The members 52 are provided with a plurality of equidistantly circumferentially spaced laterally projecting tubular bosses 54 which are disposed equidistantly from the axis of rotation of the shaft 34, these bosses constituting combined guides and bearings for slidably receiving laterally disposed and laterally slidable rods 56, the rods of the two disks 52 being disposed in longitudinal alignment with each other, and being provided upon their adjacent ends with complementary resilient holding means to be described more particularly hereinafter.

As will be better apparent from Figures 1 and 2, it is preferred to terminate or position the delivery station of the delivery chute closely adjacent the path of travel of the resilient holders carried by the rotary carrier assembly in order to facilitate the transfer of fruit from the delivery station to the carrier as set forth hereinafter.

It is contemplated that the support rods 56 of the holders shall be moved towards and from each other at properly timed intervals during the rotation of the carrier whereby the complementary resilient cups of the holders may yieldingly retain the uncut fruit during a portion of the travel of the holders upon the rotary carrier, and may thereafter retain the severed halves of the fruit during subsequent manipulations and treatment of the same by the apparatus. In order to effect and control in a properly synchronized manner this lateral movement of the rods 56 and of the resilient holders carried thereby, an actuating cam construction of the type set forth in Figures 1, 3 and 7 has been provided. By means of suitable support brackets 58 extending inwardly from suitable longitudinally disposed side members of the supporting framework 10, there is fixedly mounted a stationary cam member 60 in the form of a channel member and disposed to form a circular cam trackway of an undulating nature, whereby a cam follower in the form of a roller 62, see Figure 7, and secured by a downwardly extending pintle or axle 64 fixedly secured to the outer extremity of each of the holder rods 56, may be manipulated. It will thus be apparent that by appropriately designing the contour and undulations of the fixed and stationary cam track 60, the pairs of holder rods 56 disposed in alignment in the two rotatable carriers 52, may be selectively moved towards and from each other in controlled and timed relationship. These cam tracks are preferably so contoured and shaped as to impart a closing movement to the complementary resilient holder cups as the successive aligned pairs of holder rods reach the delivery station at the end of the delivery chute, so that the complementary holder cups may be clamped yieldably upon and thus embrace and retain a citrus fruit during passage of the rotary carrier past the delivery station. The complementary holder cups will remain closed upon the citrus fruit as the latter passes the slicer, after which the complementary cups will be opened, each cup retaining its half of the sliced fruit, and will be thereafter closed upon a reamer or juicer for extracting the juice from the fruit, and will be again opened as the rinds are carried to the extracting station and until the complementary cup-shaped holders are again closed upon the next fruit which they are to transport.

Fruit transfer mechanism

In order to facilitate the transfer of the fruit in sequential fashion from the delivery station at the end of the delivery chute to the successive holders of the rotary carrier, a novel transfer mechanism is employed. This mechanism, as shown best in Figure 4, consists of a lever or arm 66, which is welded or otherwise secured at one extremity to the above mentioned arm 42, for pivotal movement therewith about the shaft 34. At its other end, the transfer arm 66 is provided with an upwardly extending post or standard 68 which at its upper extremity is provided with an arcuately shaped support 70 which upon pivotal movement of the transfer arm 66 is adapted to pass between the previously mentioned resilient fingers 50 constituting the fruit holding means of the delivery station. As the arm 42 is pivoted in a clockwise direction, and is moved downwardly as viewed in Figure 2, the transfer arm 66 will be pivoted in the same direction and will move upwardly causing the transfer member 70 to pass upwardly between the fingers 50, to engage a citrus fruit retained thereby, and lift this fruit through the resilient fingers and upwardly above the same. As this fruit is lifted out of engagement with the fingers, the operation of the machine is so timed that a pair of aligned holder rods 56 and their complementary cup-shaped resilient holders 57 will be caused to close upon the fruit, and during further rotational travel of the rotary carrier the holders will convey the fruit from the transfer means.

It will thus be readily seen that the transfer means performs the function of selectively removing an individual fruit from the delivery station in properly timed relation for the same to be grasped by the continuously rotating holders of the rotary carrier.

Fruit holders

Attention is next directed more specifically to Figures 1, 3 and 5 for an understanding of the construction of the fruit holders 57 forming an important and essential element of this invention. As will be readily appreciated, it is necessary that the fruit holders shall be of a yieldable or resilient construction in order that the same may securely grasp a citrus fruit therebetween; securely secure the severed halves of the fruit during the subsequent manipulation of the same; and yet may be spaced from each other a sufficient distance so that passage of the slicer between the holder cups and through the fruit held thereby may be readily effected and further, so that the device may compensate for the irregularities in the size of the fruit handled by the apparatus.

Preferably, each of the cup-shaped complementary holders consists of a pair of arcuate, flexible sheet metal strips 72 and 74 which are disposed at right angles to each other and are retained rigidly upon the end of the rods 56 as by a fastening bolt 76. These arcuate strips have their outer ends or edges slightly rounded as at 78 and the complementary strips are disposed with their concaved sides towards each other to constitute a substantially spherical holder for the fruit. Preferably, the dimensions of each of the strips is such that the rounded edges 78 will resiliently press against and embrace the sides of a citrus fruit in such a manner that upon passage of the slicer through the fruit, the severed halves will be retained by this frictional but yieldable engagement.

Fruit slicer

Attention is next directed to the fruit slicing mechanism forming a further instrumentality of the apparatus, and for this purpose reference is now made more specifically to Figures 2 and 4. It will be seen that the supporting framework 10 is provided at one end with an inwardly extending supporting platform 80 having a bracket member 82 thereon, and from this bracket member depends a metallic plate 84 constituting a slicer. This plate may be of any suitable shape such as rectangular, and at its forward edge is provided with a V-shaped notch 86, the adjacent sides of which are beveled to provide a stationary severing knife. This knife or slicer depends from the supporting bracket 82 and is positioned thereby so that the same will intersect the path of travel of the fruit carried by the holders of the rotary carrier. The knife is thus preferably disposed in a vertical plane which is disposed medially of the fruit carried by and consequently medially of the complementary cup-shaped holders of the rotary carrier. It will now be seen that as the individual fruit are firmly engaged by their complementary holders, the latter owing to the previously described slightly spaced position will straddle or pass on opposite sides of the slicer 84 whereby the knife edge 86 will engage the medial portion of the fruit, will center the fruit with respect to the knife blade and will sever or halve the fruit during passage of the same by the rotary carrier.

Fruit juicer

The severed halves of the fruits, each half being retained in a complementary cup-shaped holder of the rotary carrier, are then transported to the reamer for juicing of the fruit halves. While various mechanisms could be provided for performing the juicing operation a very satisfactory mechanism has been illustrated in Figures 1, 2 and 4. The outermost extremity of the arm 42 is rigidly but adjustably secured to the lower extremity of a push rod 88, as by lock nuts 90, this rod extending through an elongated slot 92 in the platform 80, and being provided with a cam follower 94 having an anti-friction roller 96 thereon. A spring means 98 is interposed between the cam follower and the platform 80 to resiliently urge push rod 88 and consequently the pivoted lever 42 into its upward position. It should be here noted that the axis of rotation of the shaft 40 journalled in the lever or arm 42 is disposed at the same radial distance from the axis of the shaft 34 as are the various holder rods 56 so that during rotation of these holder rods their axis will be successively aligned with the axis of the shaft 40.

As shown best in Figure 1, this pivoting arm 42 preferably comprises a straight lever member 100 and a parallel lever member 102 having a laterally offset portion 104. The lever members 100 and 102 journal the shaft 40 between the outer ends of the same, the other ends of the portions 100 and 104 are journalled on the above mentioned shaft 34.

It is intended to cause the lever 42 and the juicer carried thereby to have an oscillating movement, the clockwise portion of this oscillating movement being performed in synchronism with aligned oppositely disposed holder rods 56 while the reaming or juicing operation is being performed. For this purpose, a cam 106 is rigidly attached in any suitable manner to the cam shaft 39 for rotation therewith. This cam is provided with a plurality of cam lobes 108, adapted to successively impart a downward and upward reciprocatory movement to the push rod 88 in properly timed relation. The cam lobes are so shaped that each one will cause a clockwise movement of the pivoted arm 42 at the same rotational speed as that of the rotary carrier and in properly timed relation to cause the arm to perform its arcuate clockwise movement while the shaft 40 is in alignment with one of the pairs of holder rods 56. The lobes are further so shaped upon completion of this clockwise stroke, the roller will ride from the high part of the lobe back to the base circle of the cam in a relatively short time to impart a quick upward stroke to the arm 42, whereby the latter is ready for its downward stroke in synchronization with alignment of the shaft 40 with the next pair of holder rods 56. Obviously, the desired shape of the cam lobes, and the timing of rotation of the cam and its lobes with respect to the rotation of the rotary carrier and its holders may be effected in a well known manner and further explanation of the same is believed to be unnecessary.

As shown more particularly in Figures 1 and 3, the shaft 40 is journalled intermediate its ends in the above mentioned lever members 100 and 102 of the arm 42, and at its outer ends is provided with a cup-shaped plate 110 constituting a splash shield, while a conical or tapered reamer or juicer 112 of any desired construction, is carried by the ends of the shafts outwardly of the splash plates 110. The arrangement is such that as the rotating pairs of holder rods become aligned with the shaft 40 in the upper position of the arm 42, and the arm begins to rotate in synchronized relation with travel of the holder rods, the opposite pair of rods will be moved by the cams 60 towards each other thereby pressing the severed halves of the fruit upon the reamers 112, so that the juice will be squeezed from and extracted from the fruit halves. During this reaming operation, the splash plates 110 will obviously prevent the spraying of juice, which will all drop downwardly below the machine to be collected in an appropriately spaced container indicated at 114. It will thus be seen that the severed halves of each fruit, which are laterally spaced from each other, and which are continuously rotating with the rotary carrier are brought into alignment with the reamers and their shaft, and the rotating reamer, reamer shaft and severed fruits are pressed together to extract the juice from the fruit, the latter are then removed from the reamers, which then return with an accelerated or snap action to their outward and idle position.

Rind ejector

After the severed fruit halves have been reamed and juiced, they are transported to a discharge station, at which they are extracted from their cup-shaped resilient holders and allowed to drop to a waste receptacle 116 suitably disposed beneath the ejector station. The ejector mechanism for effecting this purpose will now be readily understood from a consideration of Figures 1, 5 and 6.

Each of the complementary cup-shaped holders has a supporting bracket 118 the form of a metallic strip attached to the end of the holder rods 56, being clamped thereto beneath the strips 72 and 74 by the abovementioned fastening bolt 76. This bracket 118 underlies one of the strips such as that indicated at 74, and at its outer extremities provided with a pair of upturned integral lugs 120 between which is journalled a fulcrum pin 122. The latter constitutes the midportion of a pair of parallel, perpendicularly disposed arms 124 and 126, the former extending laterally outwardly of the cup-shaped holder, while the latter extends into the cup-shaped holder as will be apparent from Figures 5 and 6. Normally, the arm 126 is disposed beneath the fruit or the fruit half retained in the holder, and it will now be evident that when the arm 124 is oscillated, the corresponding oscillation of the arm 126 about its fulcrum pin 122, will cause the rind of the fruit to be ejected or forced from the resilient gripping engagement of the strips 72 and 74.

An automatic means for oscillating or actuating the ejector arms at the proper position in the travel of the rotary carrier and the holders carried thereby is provided. This mechanism consists of a pair of stationary actuators, one being provided for each of the rods of the two carrier disks, each actuator comprising a horizontally extending support rod 128, which is welded or otherwise rigidly secured as at 130 to a member 132 forming a part of the supporting framework 10, these rods 128 extending from this member towards the holder rods carried by the rotary carrier. At their extremities, each of these support rods 128 is provided with a perpendicularly disposed and upwardly and outwardly inclined terminal portion 134 which constitutes a cam track engaged by the laterally extending arm 124 of the ejector. The arrangement is such that, as shown in Figure 6, as the rotary carriers and the holders mounted thereon are rotated into juxtaposition to the member 132, the laterally extending arms 124 will engage the lower edge of the inclined cam portion 134, and upon further upward movement will effect oscillation of the ejector, as shown in Figure 6, until the dotted line position shown therein has been attained. This dotted line position is reached as the ejector arm 124 reaches the uppermost portion of the member 134. At this time, the ejector arm 126 will be in its dotted line position shown in Figure 6, thereby ejecting the fruit rind from the holder. This operation occurs for each of the sets of complementary holders, so that the rinds are dropped from the same into the waste receptacle 116, whereupon the holders are ready to receive the next fruit as they now approach the delivery station.

It is to be understood that various sub-combinations of the elements of this machine can be separately employed as desired, and the principles of this invention not only comprise the entire complete organization of all of the above described elements, but various sub-combinations of the same. Thus, the specific construction of the fruit holders can obviously be employed in other fruit juicing, slicing or treating machines, as can the construction of the rotary carrier and the timed operation of the fruit holders carried thereby. Further, the rotary carrier in conjunction with the pivotal arm upon which the juicer is mounted is likewise capable of separate utility. Moreover, the assembly of the fruit feeding means, the rotary carrier and the transfer means is capable of a separate and useful functioning independently of the juicer and/or the slicer. Likewise, the specific ejector mechanism is to be regarded as falling within the principles of this invention and as capable of separate use.

From the foregoing, it is thought that the operation and construction of the device together with its many advantages will be readily apparent and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. In a fruit slicing and juicing machine, a fruit holding means comprising movable support means, a pair of longitudinally alined rods slidably mounted in said support means for movement towards and from each other, a pair of cup-shaped holders on adjacent ends of said rods comprising resilient fruit engaging fingers, means for selectively moving said rods and holders towards each other for clamping a fruit therebetween and from each other for releasing a fruit, said last means being operable in timed relation to movement of said support means, a fruit juicer comprising a movable arm, a conical reamer extending laterally from opposite sides of said arm and towards said pair of cup-shaped holders, means for moving said reamer through a path of movement parallel and similar to that of said holders and means for selectively moving said holders towards and from said reamers during said parallel paths of movement.

2. In a fruit slicing and juicing machine, a fruit carrier comprising a circular body mounted for rotation on a shaft, means for rotating said body, fruit holding means mounted on said body radially outwardly therefrom for sliding movement transversely of the body, means for effecting said sliding movement of said holding means in timed relation to said rotation, a fruit reamer comprising an arm pivoted for movement about said shaft, said arm being of a length substantially equal to the radial distance from the shaft to the fruit holding means, cam means on said machine, connecting means operatively engaging the free end of said arm and said cam for imparting arcuate movement to said reamer and retaining said reamer in alignment with said fruit holding means during a predetermined portion of the rotation of the latter, said connecting means including a resiliently mounted rod continuously urging said arm in opposition to said cam, and means on the machine engaging said fruit holding means for selectively moving said holding means toward and away from the reamer during the predetermined period of the rotation of the reamer.

References Cited in the file of this patent

UNITED STATES PATENTS

| Number | Name | Date |
|---|---|---|
| 515,394 | Beuttel | Feb. 27, 1894 |
| 1,387,183 | Robbins | Aug. 9, 1921 |
| 1,392,520 | Paranteau | Oct. 4, 1921 |
| 1,496,312 | Harkin | June 3, 1924 |
| 1,555,929 | Allan | Oct. 6, 1925 |
| 1,620,551 | Hughes | Mar. 8, 1927 |
| 1,764,158 | Edwards | June 17, 1930 |
| 1,834,097 | Gum | Dec. 1, 1931 |
| 1,888,528 | Foulds | Nov. 22, 1932 |
| 2,078,737 | Segovia | Apr. 27, 1937 |
| 2,090,963 | Reese | Aug. 24, 1937 |
| 2,199,876 | Brown | May 7, 1940 |
| 2,234,445 | Martinsen | Mar. 11, 1941 |
| 2,313,318 | Brown et al. | Mar. 9, 1943 |
| 2,353,841 | McKinnis | July 18, 1944 |
| 2,376,526 | Thompson | May 22, 1945 |
| 2,428,157 | Healy | Sept. 30, 1947 |
| 2,443,863 | Lindley | June 22, 1948 |
| 2,540,772 | Woodruff | Feb. 6, 1951 |
| 2,667,961 | Reese et al. | Feb. 2, 1954 |

FOREIGN PATENTS

| Number | Country | Date |
|---|---|---|
| 6169/32 | Australia | Feb. 23, 1933 |